(12) United States Patent
Piwonka et al.

(10) Patent No.: US 7,619,544 B2
(45) Date of Patent: Nov. 17, 2009

(54) BIOS PASSWORD SECURITY USING MODIFIED SCAN CODES

(75) Inventors: Mark A. Piwonka, Houston, TX (US); Bernard D. Desselle, Houston, TX (US); David J. DeLisle, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1008 days.

(21) Appl. No.: 11/261,134

(22) Filed: Oct. 27, 2005

(65) Prior Publication Data

US 2007/0101117 A1 May 3, 2007

(51) Int. Cl.
*H03M 11/00* (2006.01)
(52) U.S. Cl. .............................. 341/26; 341/22; 726/5; 726/17; 726/28; 726/34; 713/2; 713/1; 713/168; 713/182; 713/183; 713/184; 340/5.1; 340/5.85; 710/5; 710/200; 710/67
(58) Field of Classification Search .................... 341/20, 341/22, 26; 340/5.1, 5.85; 726/5, 17, 28, 726/34; 713/1, 2, 168, 183, 182, 184; 710/5, 710/200, 67
See application file for complete search history.

(56) References Cited

U.S. PATENT DOCUMENTS

| | | | | |
|---|---|---|---|---|
| 4,959,860 A | * | 9/1990 | Watters et al. | 726/19 |
| 6,397,337 B1 | * | 5/2002 | Garrett et al. | 726/19 |
| 6,618,810 B1 | * | 9/2003 | Dirie | 726/27 |
| 7,100,036 B2 | * | 8/2006 | Schwartz | 713/2 |
| 7,367,062 B2 | * | 4/2008 | Chang | 726/28 |
| 7,376,968 B2 | * | 5/2008 | Ritz et al. | 726/17 |
| 7,395,434 B2 | * | 7/2008 | Piwonka et al. | 713/183 |
| 7,429,911 B2 | * | 9/2008 | Hirose | 340/5.54 |
| 7,484,241 B2 | * | 1/2009 | Challener et al. | 726/5 |
| 7,540,023 B2 | * | 5/2009 | Ito et al. | 726/20 |

* cited by examiner

*Primary Examiner*—Albert K Wong

(57) ABSTRACT

A BIOS password security technique includes first logic operable to extract a down scan code from a keyboard input queue, the down scan code having a most significant bit; second logic operable to examine case-related auxiliary information; and third logic operable to set the state of the most significant bit responsive to the case-related auxiliary information, thereby creating a modified scan code.

15 Claims, 5 Drawing Sheets

BIOS PASSWORD SECURITY USING MODIFIED SCAN CODES

FIELD OF THE INVENTION

This invention relates generally to computer security.

BACKGROUND

When power to a computer is turned on or a reset is performed, basic input/output services ("BIOS") code executes. Soon after it begins executing, and depending on the CMOS settings of the computer, the BIOS code may prompt the user for a password before allowing the user to change the settings of the computer or to boot an operating system. In addition, application-level software running after an operating system is loaded may require verification of a user's BIOS-level password prior to taking certain actions such as requesting a reflash of BIOS memory. These features are commonly known as "BIOS password security."

FIG. 1 illustrates prior art methods for implementing BIOS password security. Each time a key on keyboard 100 transitions from an up position to a down position or vice versa, a corresponding native code 102 is transmitted to a microcontroller 104 inside host computer 106. (Host computer 106 would normally also include traditional components such as one or more microprocessors, system memory, a hard disk, and one or more additional i/o devices such as a display device.) In response, microcontroller 104 translates the native code received from the keyboard into an up or down scan code 108 and generates a keyboard interrupt, which invokes a BIOS INT9 handler 110 (or, if an operating system with its own keyboard driver has been loaded, a corresponding handler in the keyboard driver).

An up or down scan code is an eight-bit value that identifies a particular key on the keyboard and whether the key has just transitioned to an up position or to a down position. For example, when the "A" key on a keyboard is pressed and released with no modifier keys such as caps lock or shift active, a sequence of two scan codes is presented to the handler: 1Eh ("A" key down), and 9Eh ("A" key up).

The handler responds to the scan code by updating certain data structures in the BIOS data area of memory. Basically, for a scan code corresponding to a character-producing key (numerous keys on a standard keyboard are not character-producing keys), the handler writes the down code for the key to input queue 112 along with a corresponding ASCII code. No up scan codes are stored in queue 112. To generate the correct ASCII value for the key, the handler consults modifier state information 114. For example, if an "A" scan code is received when the state of caps lock is on but no other modifiers are active, then the correct ASCII code to store in queue 112 would be 41h (uppercase A). But if caps lock is off and no other modifiers are active, then the correct ASCII code would be 61h (lowercase a). For a character-producing key that does not correspond to an ASCII value, the handler stores a zero for the ASCII code component of the queue entry.

For a scan code corresponding to a non-character producing key such as ctrl, alt, right or left shift, caps lock, scroll lock, num lock, etc., the handler simply makes an appropriate update to modifier state information 114. Some elements of the modifier state are associated with toggle functions such as insert mode, caps lock, num lock and scroll lock. This state is interpreted as "on" versus "off." Other elements of this state are associated with particular keys; this state is interpreted as "up" versus "down" as shown.

Two methods have been employed by prior art BIOS password security routines 116 when setting a new password: In the first method, the BIOS retrieves the down scan codes corresponding to a password from input queue 112. The BIOS then optionally encrypts the down scan codes using an encryption algorithm 118. It then stores the down scan codes 120 or the encrypted down scan codes 122 in a stored password area of memory 124. In the second method, the BIOS retrieves all or a portion of the ASCII codes corresponding to the password from input queue 112. It then optionally encrypts the ASCII codes and stores either the ASCII codes 124 or the encrypted ASCII codes 126 in stored password area 124. The first method is case insensitive, while the second method is case sensitive.

When verifying a password, either the BIOS or an application program 128 may extract user input from input queue 112 (usually via an INT16h handler) and may present them to routines 116. In response, routines 116 may execute the same algorithms just described using down scan codes or ASCII, except that in this context the routines would compare values with, rather than store values into, memory area 124.

DETAILED DESCRIPTION OF THE PREFERRED EMBODIMENTS

Figure 1:
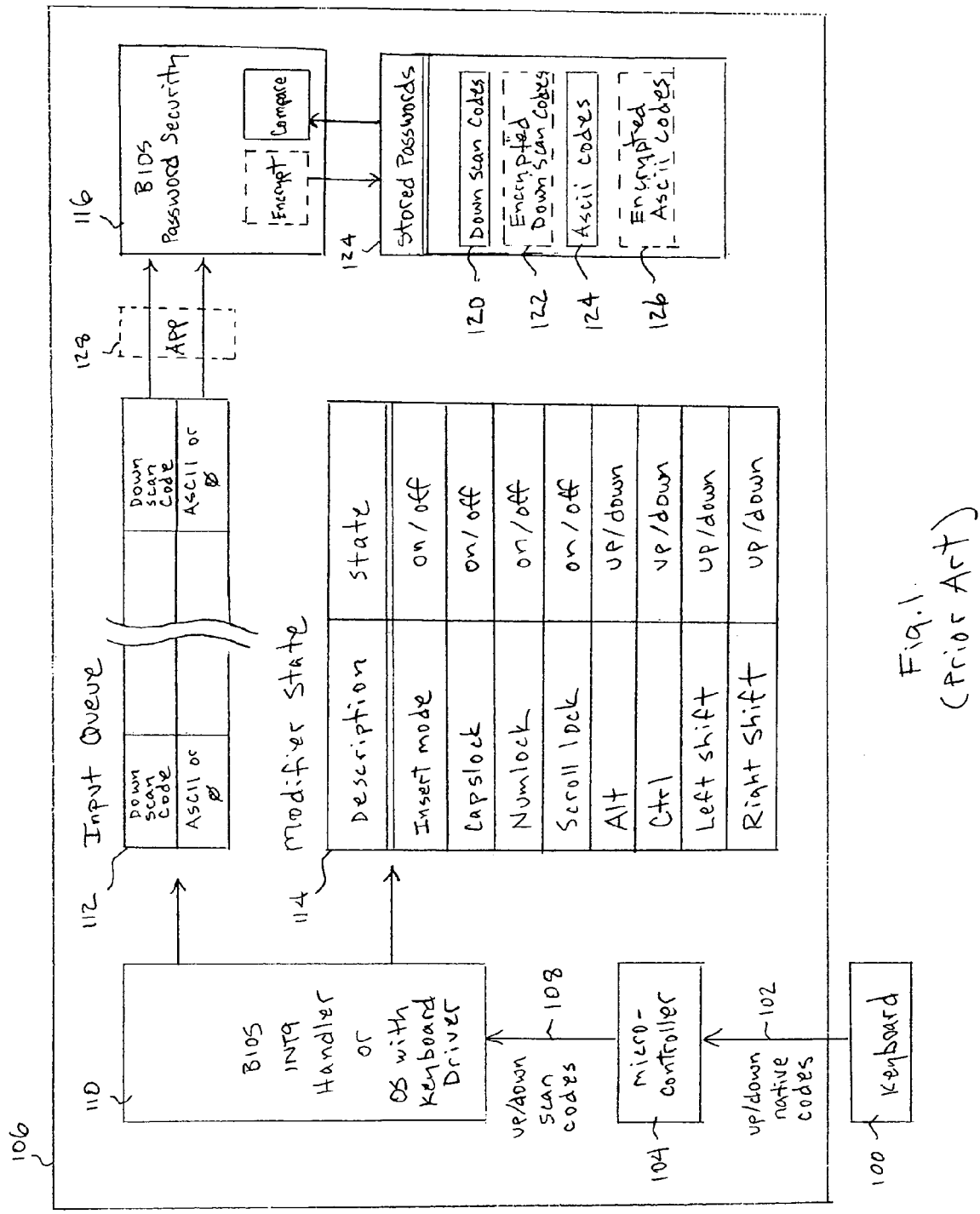
FIG. 1 is a block diagram illustrating BIOS password security methods and apparatus of the prior art.
Figure 2:
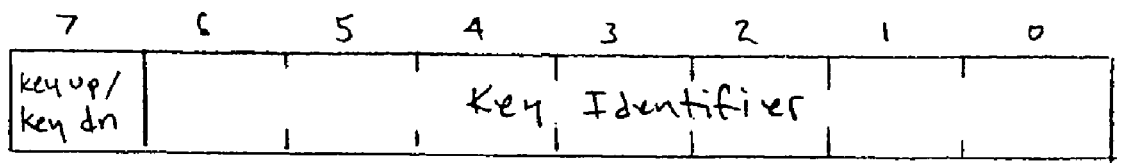
FIG. 2 is a block diagram illustrating the format of a scan code according to the prior art.

FIG. 2 illustrates the format of a prior art keyboard scan code 200. Bits 0-6 are used to uniquely identify one of the keys on keyboard 100. (128 keys can be uniquely identified using 7 bits.) Bit 7, the most significant bit of the byte, is used to indicate whether the scan code signifies an up-to-down transition or a down-to-up transition for the key that is identified by bits 0-6. For down-to-up transitions, bit 7 is set to 1. For up-to-down transitions, bit 7 is set to 0.

The inventors hereof have observed that the information in bit 7 of a prior art scan code is needed only by the BIOS INT9 handler or operating system keyboard driver 110, and that scan codes that are placed in input queue 112 are always down scan codes. In other words, bit 7 is always set to 0 in the scan codes that are resident in input queue 112. Thus, after BIOS INT9 handler or operating system keyboard driver 110 has utilized the information in bit 7 of a scan code, bit 7 may then be changed and utilized for a different purpose.

Figure 3:
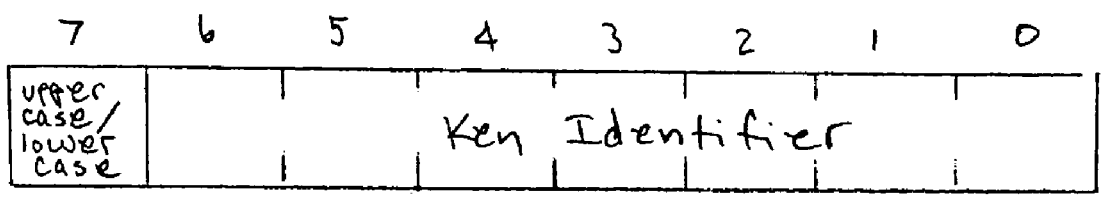
FIG. 3 is a block diagram illustrating the format of a modified scan code according to a preferred embodiment of the invention.

FIG. 3 illustrates a modified scan code 300 according to a preferred embodiment of the invention. In scan code 300, bits 0-6 are used as they are in scan code 200—to uniquely identify one of the keys on keyboard 100. But bit 7 in scan code 300 is used to signify whether the character represented by the key in bits 0-6 is upper case or lower case.

Figure 4:
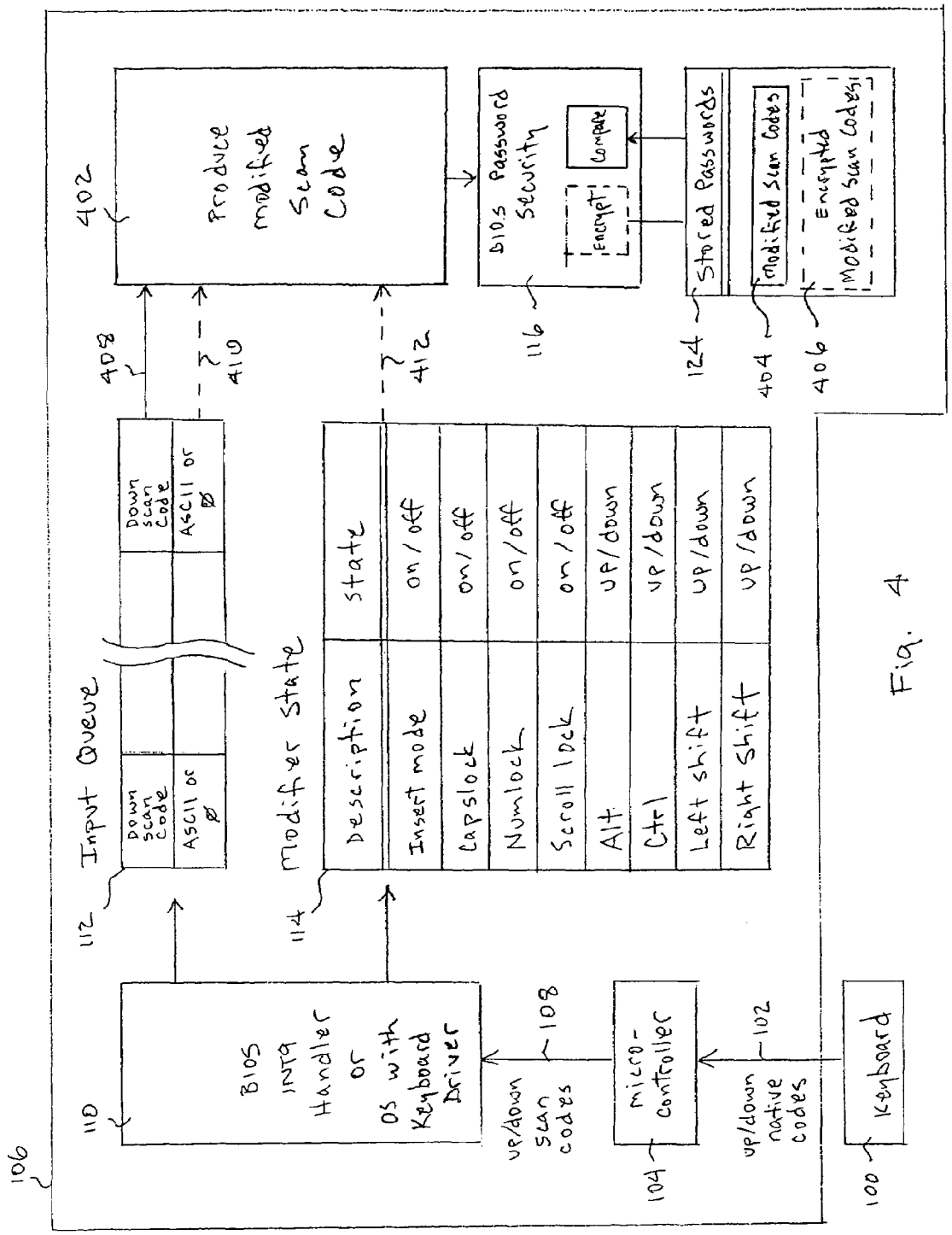
FIG. 4 is a block diagram illustrating BIOS password security methods and apparatus according to preferred embodiments of the invention.

FIG. 4 illustrates a computer 400 that utilizes modified scan codes according to a preferred embodiment of the invention. In addition to the components illustrated, computer 400 may also include traditional components such as one or more microprocessors, system memory, a hard disk, and one or more additional i/o devices such as a mouse and a display device. As can be seen from the illustration, computer 400 is similar to computer 106, but computer 400 contains an additional component-logic 402 for producing modified scan codes. And in the area of memory 124 where passwords are stored, computer 400 stores either modified scan codes 404 or encrypted modified scan codes 406, as shown. Logic 402 may be part of the BIOS, as it would be when setting or verifying BIOS passwords before an operating system is loaded. In addition, logic 402 or an additional logic with similar functionality may be part of application-level software, for use after an operating system is loaded and in the event a user's BIOS password must be verified before performing a requested operation such as reflashing BIOS memory.

Preferably, logic 402 is able to extract a down scan code 200 from keyboard input queue 112 as shown at 408. Logic 402 should also be able to examine case-related auxiliary information such as information 410 or 412. Responsive to the case-related auxiliary information, logic 402 should be able to set the state of the most significant bit of down scan code 200 (usually bit 7), thereby creating a modified scan code 300. Thereafter, logic 402 may communicate modified scan code 300 to BIOS password security routines 116, as described above, for the purpose of setting or verifying a user password.

Figure 5:
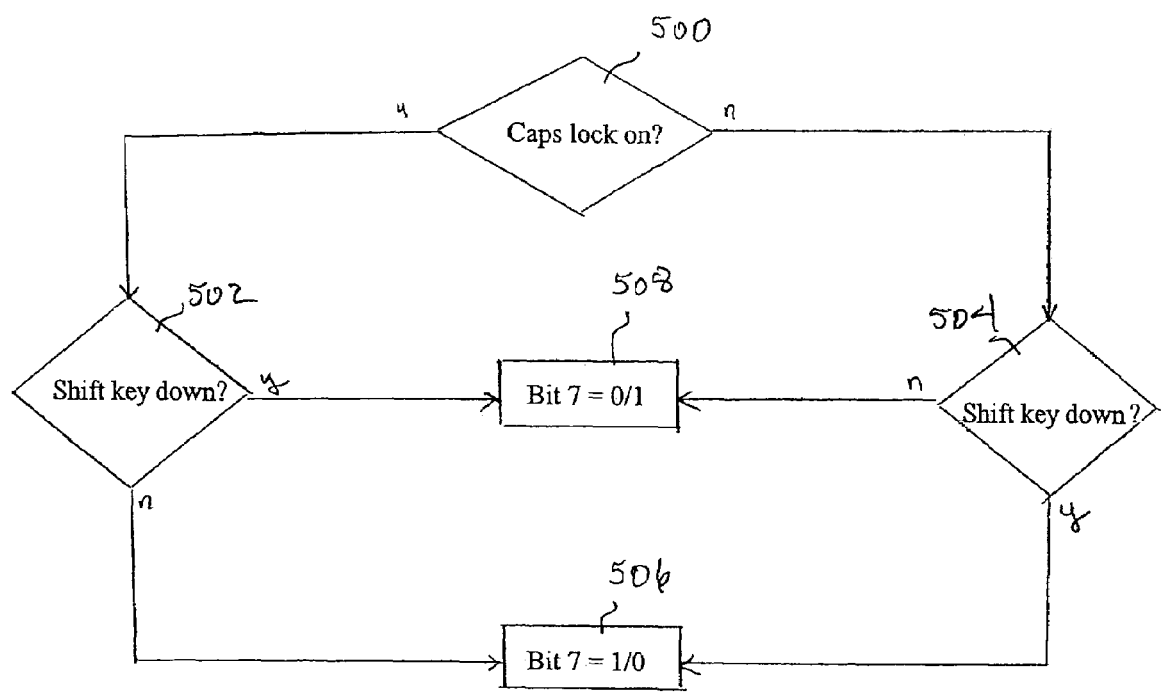
FIG. 5 is a flow diagram illustrating a first preferred method for producing the modified scan code of FIG. 3.

A number of different techniques may be employed to generate modified scan codes 300 responsive to case-related auxiliary information without deviating from the scope of the invention as it is claimed herein. One such technique is illustrated in FIG. 5. In an embodiment according to FIG. 5, logic 402 utilizes case-related auxiliary information 412 stored in modifier state area 114. When a down scan code is extracted from queue 112, logic 402 checks the states of caps lock and left and right shift in modifier state area 114 as generally shown at 500, 502, 504. As shown at 506, logic 402 will set bit 7 of the scan code to a first value (1 or 0) if caps lock is off and at least one of the shift keys is down, or if caps lock is on and both of the shift keys are up. As shown at 508, logic 402 will set bit 7 of the scan code to a second value (0 or 1) if caps lock is off and both shift keys are up, or if caps lock is on and at least one of the shift keys is down. As persons having ordinary skill in the art will appreciate, the functionality indicated in FIG. 5 may be implemented in a variety of ways; all such implementations are intended to fall within the scope of the invention as it is claimed herein. For example, bit 7 of the scan code may be set equal to the exclusive OR of a "caps lock on" variable or signal and a "shift key down" variable or signal.

It should be noted that, in the technique of FIG. 5, modifier state 114 could theoretically change between the time when a down scan code is placed in queue 112 and the time when it is extracted. In practice, however, logic 402 can become aware of the availability of a scan code and extract the scan code extremely quickly. Consequently, under normal circumstances, only one scan code will be present in queue 112 at a time, and modifier state 114 will be the same when the scan code is extracted as it was when the scan code was placed in the queue.

Figure 6:
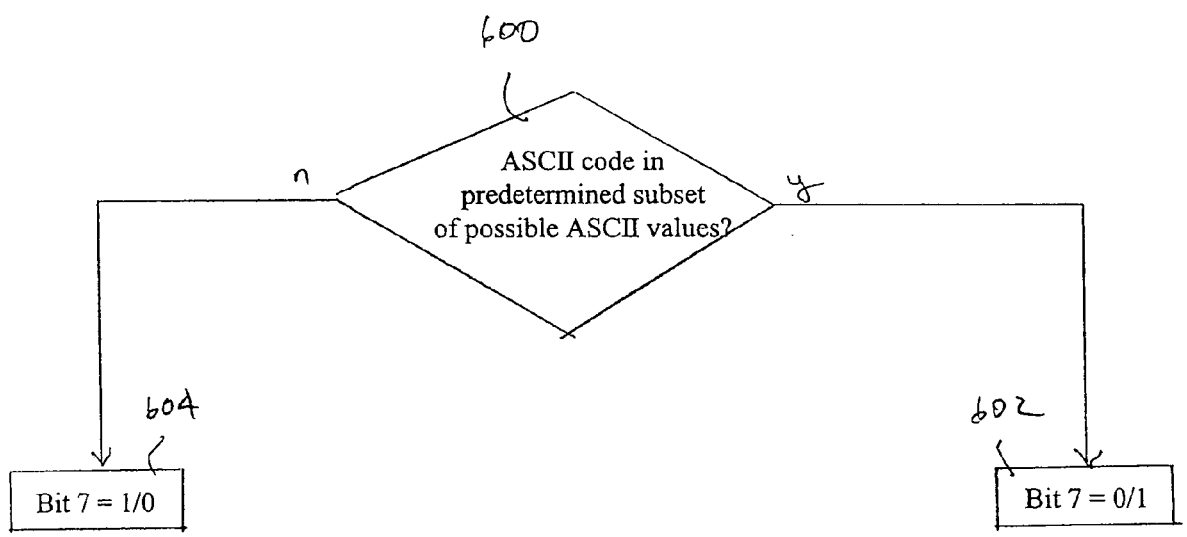
FIG. 6 is a flow diagram illustrating a second preferred method for producing the modified scan code of FIG. 3.

Another technique for generating modified scan codes 300 is illustrated in FIG. 6. In an embodiment according to FIG. 6, logic 402 utilizes case-related auxiliary information 410, which comprises ASCII codes or zeroes stored in keyboard input queue 112 in association with down scan codes. A subset of the set of possible ASCII values can be determined in advance. Then, as down scan codes and their associated ASCII codes are extracted from queue 112, logic 402 can examine the ASCII code for a given down scan code to determine, as indicated in step 600, whether the ASCII code falls within the predetermined subset. If so, logic 402 sets bit 7 of the scan code to a first value (0 or 1) as shown at 602. If not, logic 402 sets bit 7 of the scan code to a second value (1 or 0) as shown at 604. The subset can be defined in a variety of ways. For example, the subset may be defined as all those ASCII codes whose values are less than or equal to decimal 90, which corresponds to upper-case Z. If such a partition is chosen, codes in the subset may be assumed to represent upper-case characters, while codes outside the subset may be assumed to represent lower-case values. As persons having ordinary skill in the art will appreciate after having reference to this disclosure, a variety of partitions may be applied to the set of possible ASCII values to achieve a suitable result in accordance with the invention as it is claimed herein.

One of the benefits provided by the inventive apparatus and techniques described herein is that they enable BIOS password security not only to be case sensitive, but also language-independent. For example, using techniques according to the invention, BIOS INT9 handler 110 may be written to assume an English keys-to-ASCII mapping. The BIOS may then be used to set and/or verify passwords before an operating system with a keyboard driver is loaded. Then, if a French keyboard driver were loaded by the operating system, case-sensitive BIOS password security would continue to function correctly even though an English keys-to-ASCII mapping was assumed by the BIOS when the user's passwords were set. This is efficient, because it eliminates the need for the BIOS to include a variety of language-specific keyboard drivers.

While the invention has been described in detail with reference to preferred embodiments thereof, the described embodiments have been presented by way of example and not by way of limitation. It will be understood by those skilled in the art that various changes may be made in the form and details of the described embodiments without deviating from the spirit and scope of the invention as defined by the appended claims. For example, components illustrated in FIG. 4 may be implemented in hardware, software or firmware.

What is claimed is:

1. A computer, comprising:
   first logic operable to extract a down scan code from a keyboard input queue, the down scan code having a most significant bit;
   second logic operable to examine case-related auxiliary information; and
   third logic operable to set the state of the most significant bit responsive to the case-related auxiliary information, thereby creating a modified scan code.

2. The computer of claim 1, further comprising:
   fourth logic for communicating the modified scan code to BIOS password security routines for the purpose of setting or verifying a password.

3. The computer of claim 1, wherein:
   the case-related auxiliary information comprises a caps lock on/off state and at least one shift key up/down state.

4. The computer of claim 3, wherein:
   the third logic sets the state of the most significant bit to a first value when the caps lock state is off and the shift key state is down, or the caps lock state is on and the shift key state is up; and the third logic sets the state of the most significant bit to a second value when the caps lock state is off and the shift key state is up, or the caps lock state is on and the shift key state is down.

5. The computer of claim 1, wherein:

the case-related auxiliary information comprises an ASCII code associated with the down scan code.

6. The computer of claim 5, wherein:

the third logic sets the state of the most significant bit to a first value when the ASCII code falls within a predetermined subset of possible ASCII values, and to a second value when the ASCII code does not fall within the predetermined subset of possible ASCII values.

7. A computer readable storage medium containing a program code that, when executed by a computer, causes the computer to perform a BIOS password security method, the method comprising:

extracting a down scan code from a keyboard input queue, the down scan code having a most significant bit;

examining case-related auxiliary information; and setting the state of the most significant bit responsive to the case-related auxiliary information, thereby creating a modified scan code.

8. The program code of claim 7, wherein the method further comprises:

communicating the modified scan code to BIOS password security routines for the purpose of setting or verifying a password.

9. The program code of claim 7, wherein:

the case-related auxiliary information comprises a caps lock on/off state and at least one shift key up/down state; and setting the state of the most significant bit comprises setting the state of the bit to a first value when the caps lock state is off and the shift key state is down, or the caps lock state is on and the shift key state is up; and to a second value when the caps lock state is off and the shift key state is up, or the caps lock state is on and the shift key state is down.

10. The program code of claim 7, wherein:

the case-related auxiliary information comprises an ASCII code associated with the down scan code; and setting the state of the most significant bit comprises setting the state of the bit to a first value when the ASCII code falls within a predetermined subset of possible ASCII values, and to a second value when the ASCII code does not fall within the predetermined subset of possible ASCII values.

11. BIOS security password apparatus, comprising:

means for extracting a down scan code from a keyboard input queue, the down scan code having a most significant bit;

means for examining case-related auxiliary information; and means for setting the state of the most significant bit responsive to the case-related auxiliary information, thereby creating a modified scan code.

12. A BIOS password security method, comprising:

extracting a down scan code from a keyboard input queue, the down scan code having a most significant bit;

examining case-related auxiliary information; and setting the state of the most significant bit responsive to the case-related auxiliary information, thereby creating a modified scan code.

13. The method of claim 12, further comprising:

communicating the modified scan code to BIOS password security routines for the purpose of setting or verifying a password.

14. The method of claim 12 wherein:

the case-related auxiliary information comprises a caps lock on/off state and at least one shift key up/down state; and setting the state of the most significant bit comprises setting the state of the bit to a first value when the caps lock state is off and the shift key state is down, or the caps lock state is on and the shift key state is up; and to a second value when the caps lock state is off and the shift key state is up, or the caps lock state is on and the shift key state is down.

15. The method of claim 12, wherein:

the case-related auxiliary information comprises an ASCII code associated with the down scan code; and setting the state of the most significant bit comprises setting the state of the bit to a first value when the ASCII code falls within a predetermined subset of possible ASCII values, and to a second value when the ASCII code does not fall within the predetermined subset of possible ASCII values.

\* \* \* \* \*